United States Patent
Guthrie et al.

(10) Patent No.: US 7,648,731 B2
(45) Date of Patent: Jan. 19, 2010

(54) FABRICATING PERPENDICULAR WRITE ELEMENTS IN PERPENDICULAR MAGNETIC RECORDING HEADS

(75) Inventors: Hung-Chin Guthrie, Saratoga, CA (US); Ming Jiang, San Jose, CA (US); Yinshi Liu, Foster City, CA (US); Aron Pentek, San Jose, CA (US); John J. Yang, San Ramon, CA (US); Sue Siyang Zhang, Saratoga, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 714 days.

(21) Appl. No.: 11/380,154

(22) Filed: Apr. 25, 2006

(65) Prior Publication Data

US 2008/0145524 A1 Jun. 19, 2008

(51) Int. Cl.
*B05D 5/12* (2006.01)
(52) U.S. Cl. .......................................... 427/131; 216/22
(58) Field of Classification Search ........................ None
See application file for complete search history.

(56) References Cited

U.S. PATENT DOCUMENTS

| | | | |
|---|---|---|---|
| 6,641,984 B2 | 11/2003 | Kamijima | |
| 7,469,467 B2 * | 12/2008 | Gao et al. | 29/603.16 |
| 7,477,481 B2 * | 1/2009 | Guthrie et al. | 360/119.03 |
| 2004/0117976 A1 | 6/2004 | Sato et al. | |
| 2004/0212924 A1 | 10/2004 | Lee | |
| 2005/0011064 A1 | 1/2005 | Lee | |
| 2006/0002019 A1 * | 1/2006 | Guthrie et al. | 360/125 |
| 2006/0028762 A1 * | 2/2006 | Gao et al. | 360/125 |
| 2006/0044681 A1 * | 3/2006 | Le et al. | 360/126 |
| 2006/0044682 A1 * | 3/2006 | Le et al. | 360/126 |
| 2008/0145524 A1 * | 6/2008 | Guthrie et al. | 427/131 |

* cited by examiner

*Primary Examiner*—Allan Olsen
(74) *Attorney, Agent, or Firm*—Duft Bornsen & Fishman, LLP

(57) ABSTRACT

Methods of fabricating perpendicular write elements for perpendicular magnetic recording heads are discussed. In write element fabrication, write poles are fabricated according to one of many desired methods. The write poles during fabrication are typically covered by a hard mask and a photolithographic soft mask. According to the methods described herein, the soft mask is removed such as by chemical etching. The hard mask is then removed, such as by CMP and ion etching, to expose the write poles. Shield gap material may then be deposited on the write poles to define the shield gap between the write poles and the trailing shields. Trailing shield material may then be deposited on the shield gap material to form the trailing shields corresponding with the write poles.

21 Claims, 10 Drawing Sheets

FABRICATING PERPENDICULAR WRITE ELEMENTS IN PERPENDICULAR MAGNETIC RECORDING HEADS

BACKGROUND OF THE INVENTION

1. Field of the Invention

The invention is related to the field of recording head fabrication and, in particular, to improved methods of fabricating perpendicular write elements in perpendicular magnetic recording heads. More particularly, improved methods are discussed to form the write pole and the trailing shield of a perpendicular write element.

2. Statement of the Problem

Magnetic disk drive systems typically include a magnetic disk, a recording head having write and read elements, a suspension arm, and an actuator arm. As the magnetic disk is rotated, air adjacent to the disk surface moves with the disk. This allows the recording head (also referred to as a slider) to fly on an extremely thin cushion of air, generally referred to as an air bearing. When the recording head flies on the air bearing, the actuator arm swings the suspension arm to place the recording head over selected circular tracks on the rotating magnetic disk where signal fields are written to and read by the write and read elements, respectively. The write and read elements are connected to processing circuitry that operates according to a computer program to implement write and read functions.

Magnetic disk drives have typically been longitudinal magnetic recording systems, wherein magnetic data is recorded as magnetic transitions formed longitudinally on a disk surface. The surface of the disk is magnetized in a direction along a track of data and then switched to the opposite direction, both directions being parallel with the surface of the disk and parallel with the direction of the data track.

Unfortunately, data density requirements are fast approaching the physical limits. Overall data density (or areal density) may be improved by improving linear density and/or track density. To improve linear density, bit sizes on a track need to be reduced which in turn requires decreasing the grain size of the magnetic medium. As this grain size shrinks, the magnetic field required to write a bit of data increases proportionally. The ability to produce a magnetic field strong enough to write a bit of data using conventional longitudinal write head technologies is reaching its physical limit.

One way to achieve higher density recordings is with perpendicular recording. In perpendicular recording systems, bits of data are recorded magnetically perpendicular to the plane of the surface of the disk. The magnetic disk may have a relatively high coercivity material at its surface and a relatively low coercivity material just beneath the surface. A write pole having a small cross section and very high magnetic flux emits a strong, concentrated magnetic field perpendicular to the surface of the disk. This magnetic field emitted from the write pole is sufficiently strong to overcome the high coercivity of the surface material and magnetize it in a direction perpendicular to its surface. The magnetic flux then flows through the relatively soft underlayer (SUL) and returns to the surface of the disk at a location adjacent to a return pole of the perpendicular write element. The return pole of the write element typically has a cross section that is much larger than that of the write pole so that the magnetic flux through the disk at the location of the return pole (as well as the resulting magnetic field between the disk and return pole) is sufficiently spread out to render the magnetic flux too weak to overcome the coercivity of the disk surface material. In this way, the magnetization imparted by the write pole is not erased by the return pole.

FIG. 1 illustrates a typical perpendicular write element 100 adapted to write to a perpendicular magnetic recording medium 120. Write element 100 generally includes a yoke 101 comprising a write pole 102 and a return pole 104. Write element 100 also includes a coil wrapped around yoke 101 that is not shown. Perpendicular recording medium 120 includes a perpendicular magnetic recording layer 122 and a soft underlayer (SUL) 124.

When in operation, perpendicular recording medium 120 spins from left to right in FIG. 1. A magnetic flux is generated in yoke 101 due to an electrical current flowing through the coils (not shown). The magnetic flux flows through write pole 102, and write pole 102 emits a magnetic field across the write gap into perpendicular recording medium 120. The magnetic flux then flows through the SUL 124 and returns to the surface of the disk at a location adjacent to return pole 104. As the magnetic field passes through perpendicular magnetic recording layer 122, the perpendicular component of the magnetic field influences the magnetization orientation of the perpendicular magnetic recording layer 122 in the direction of the magnetic field. The magnetization orientations of three bits in perpendicular magnetic recording layer 122 are illustrated as single arrows pointing up or down in FIG. 1.

When write element 100 is writing to perpendicular recording medium 120, write pole 102 has a leading side 106 and a trailing side 107. To prevent writing to neighboring bits along the track, a trailing shield 108 may be added proximate to the trailing side 107 of write pole 102. The separation between the trailing shield 108 and the write pole 102 is referred to as the shield gap. Trailing shield 107 shunts unwanted magnetic flux from write pole 102.

FIGS. 2-3 illustrate a method 200 of fabricating write poles and trailing shields for perpendicular write elements. FIG. 2 is a flow chart illustrating the method of fabricating, while FIG. 3 illustrates the results of method 200 in forming the layers of the write poles, the trailing shields, etc. Although method 200 described in FIG. 2 applies to wafer-level fabrication, FIG. 3 shows the results for a single perpendicular write element being fabricated on a wafer (not shown). The reference numbers of the steps shown in FIG. 2 are also referenced in FIG. 3.

In step 201, write pole material 301 is deposited (e.g., NiFe, CoNiFe, CoFe, or laminated CoFe/Cr) on the wafer. In step 202, a hard mask 302 is deposited on the write pole material 201. The hard mask 302 may comprise a Thin Alumina Mask (TAM). In step 203, photolithographic soft masks 303 are formed on the hard mask 302 corresponding with the locations of the write poles through deposition and patterning steps. In step 204, ion milling or another similar process is performed on the wafer to remove the write pole material 301 and the hard mask 302 not covered by the soft masks 303. After step 204, write poles 304 remain covered by the hard mask 302 and the soft mask 303. At this point, there may be a targeted re-deposition of the write pole material 301 on the sides of the write pole 304 to achieve a desired shape of the write pole 304. In FIG. 3, the top surface of the write pole 304 comprises the trailing side of the write pole, which is shown as surface 107 in FIG. 1.

In step 205, insulating material 305 (e.g., aluminum oxide) is deposited over the write poles 304, the hard mask 302, and the soft masks 303. In step 206, chemical mechanical polishing (CMP) is performed to a desired depth, which removes some of the insulating material and the soft masks 303. After CMP, notches 306 remain on top of the hard mask 302. In step 207, trailing shield material 307 is deposited to form the trailing shields 308.

One problem with conventional methods of fabrication such as described above is that control of the shield gap between the write pole 304 and the trailing shield 308 may not be as precise as desired. In this fabrication process, the hard mask 302 remains between the write pole 304 and the trailing shield 308. Thus, the thickness of the hard mask 302 defines the shield gap, which may not be as precisely controlled during fabrication as desired.

SUMMARY OF THE SOLUTION

The invention solves the above and other related problems with methods of fabricating perpendicular write elements in perpendicular magnetic recording heads that remove the hard mask formed on the write pole. With the hard mask removed, shield gap material may be formed on the write pole in a precise manner to control the shield gap. The trailing shield material may then be deposited to form the trailing shield with precise shield gap control. The fabrication methods discussed herein have other advantages, such as reduced time and ease of fabrication.

One embodiment comprises a method of fabricating a perpendicular write element for a perpendicular magnetic recording head. According to the method, write poles are formed according to one of many desired methods. For instance, write pole material may be first deposited on a wafer. A hard mask (e.g., Thin Alumina Mask (TAM)) may then be deposited on the write pole material. Soft masks may then be formed on the hard mask corresponding with the locations of the write poles. The wafer may then be ion milled to remove the write pole material and the hard mask not covered by the soft masks. The result is a plurality of write poles covered by a hard mask and a soft mask. There may be other examples of how to form the write poles.

According to the fabrication method, the soft masks are then removed and insulating material may be deposited. The soft masks may be removed with a chemical etch, such as with NMP, TMAH, etc. The hard mask may then be removed along with some of the insulating material. The hard mask may be removed according to many desired methods, such as with chemical mechanical polishing (CMP), Reactive Ion Beam Etching (RIBE), Reactive Ion Etching (RIE), etc. Shield gap material may then be deposited on the write poles. Trailing shield material may then be deposited on the shield gap material to form the trailing shields that are adjacent to the write poles.

This method advantageously removes the soft masks before depositing the insulating material over the write poles. Removing the soft masks before depositing the insulating material makes the removal process easier than removing the soft masks after depositing the insulating material and performing CMP as is presently done. This method also advantageously removes the hard mask from the write poles. Prior methods left the hard mask in between the write poles and the trailing shields to define the shield gap between the write poles and the trailing shields. Unfortunately, the hard mask may not provide as accurate of a shield gap as desired. According to the methods described herein, the hard mask is removed so that shield gap material (e.g., Rh) may then be precisely deposited on the write poles to accurately define the shield gap.

Other exemplary embodiments described herein provide alternative methods of fabrication, which are described in more detail below.

DESCRIPTION OF THE DRAWINGS

The same reference number represents the same element on all drawings.

DETAILED DESCRIPTION OF THE INVENTION

FIGS. 4-10 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
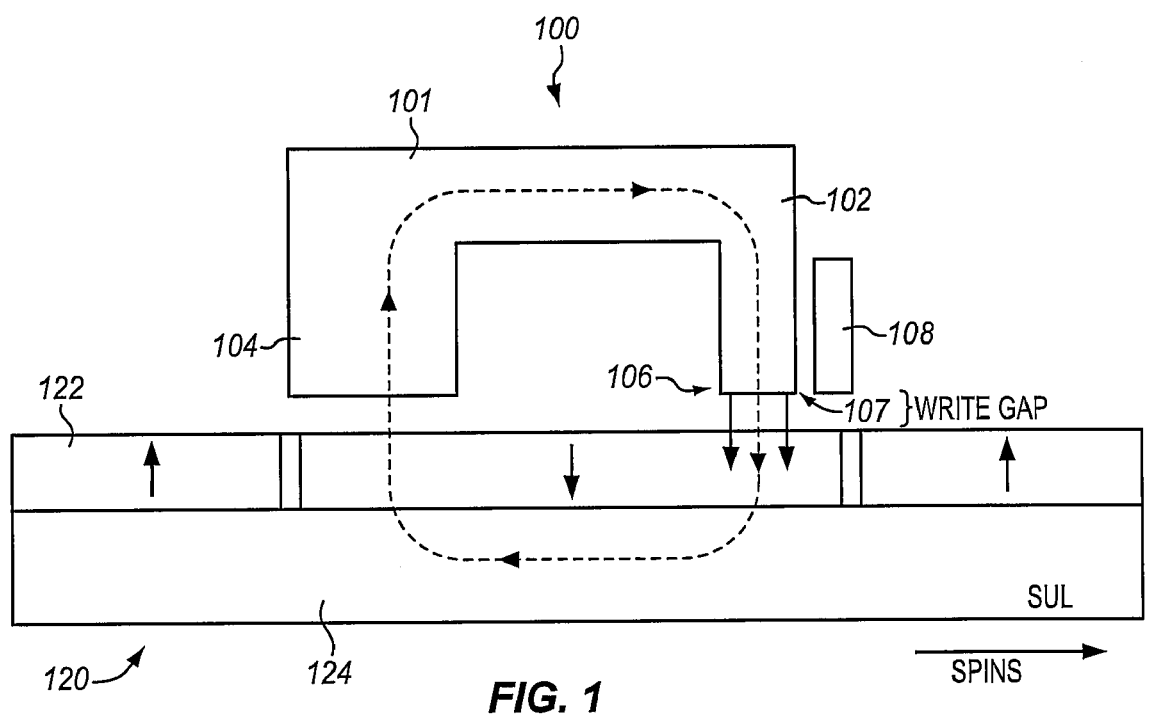
FIG. 1 illustrates a typical perpendicular write element adapted to write to a perpendicular magnetic recording medium.
Figure 2:
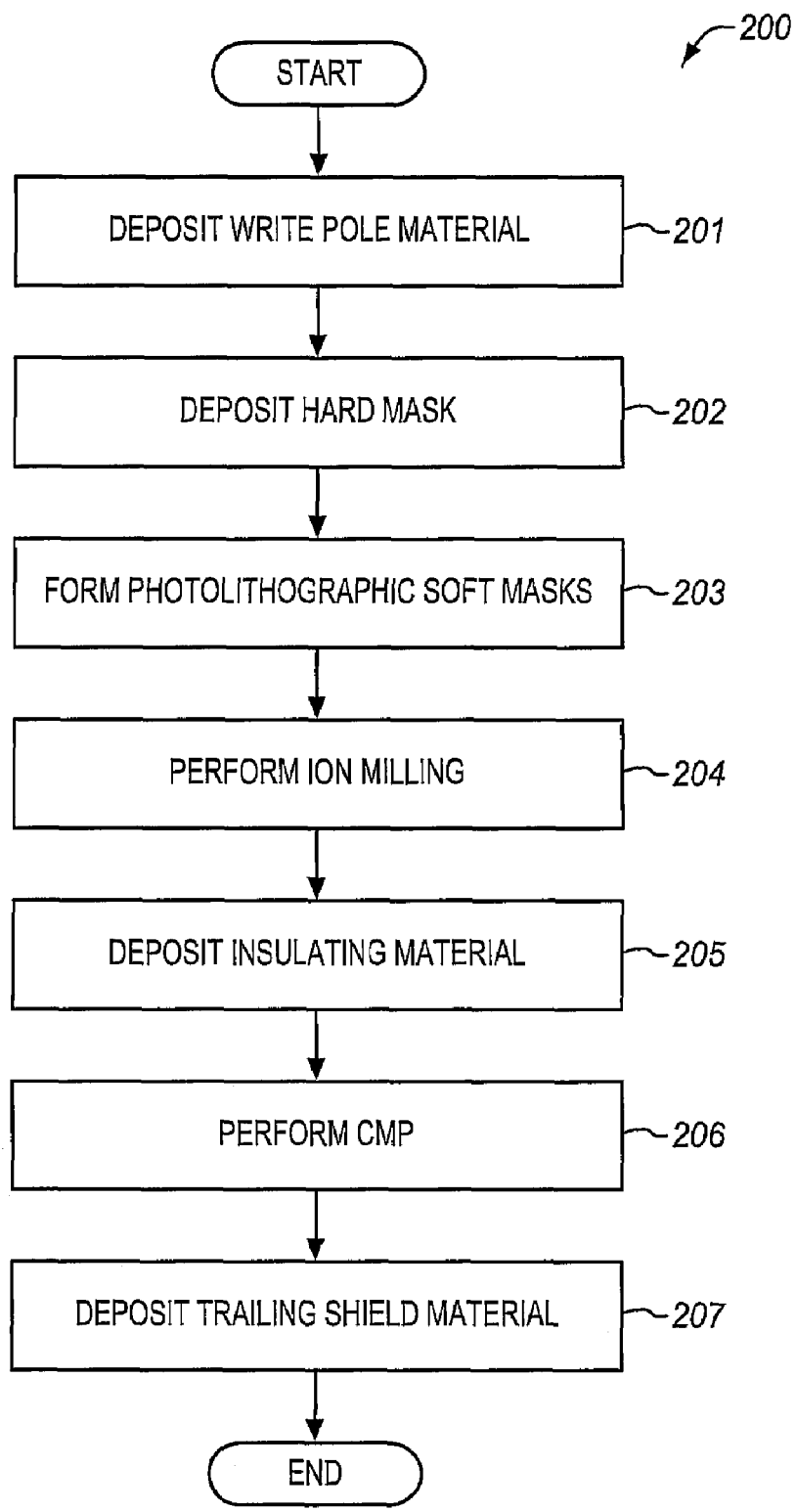
FIGS. 2-3 illustrate a prior art method of fabricating write poles and trailing shields for perpendicular write elements.
Figure 3:
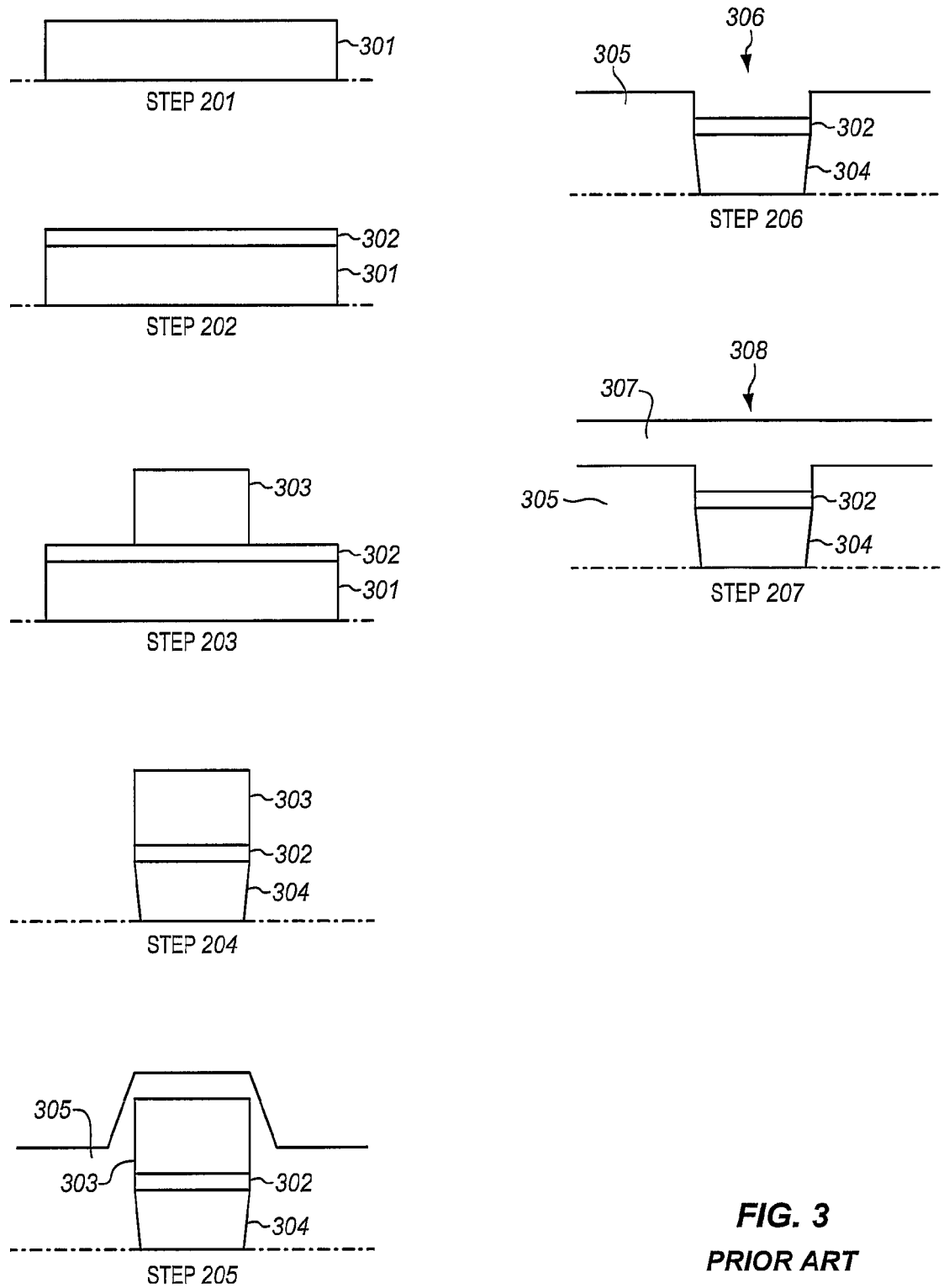
Figure 4:
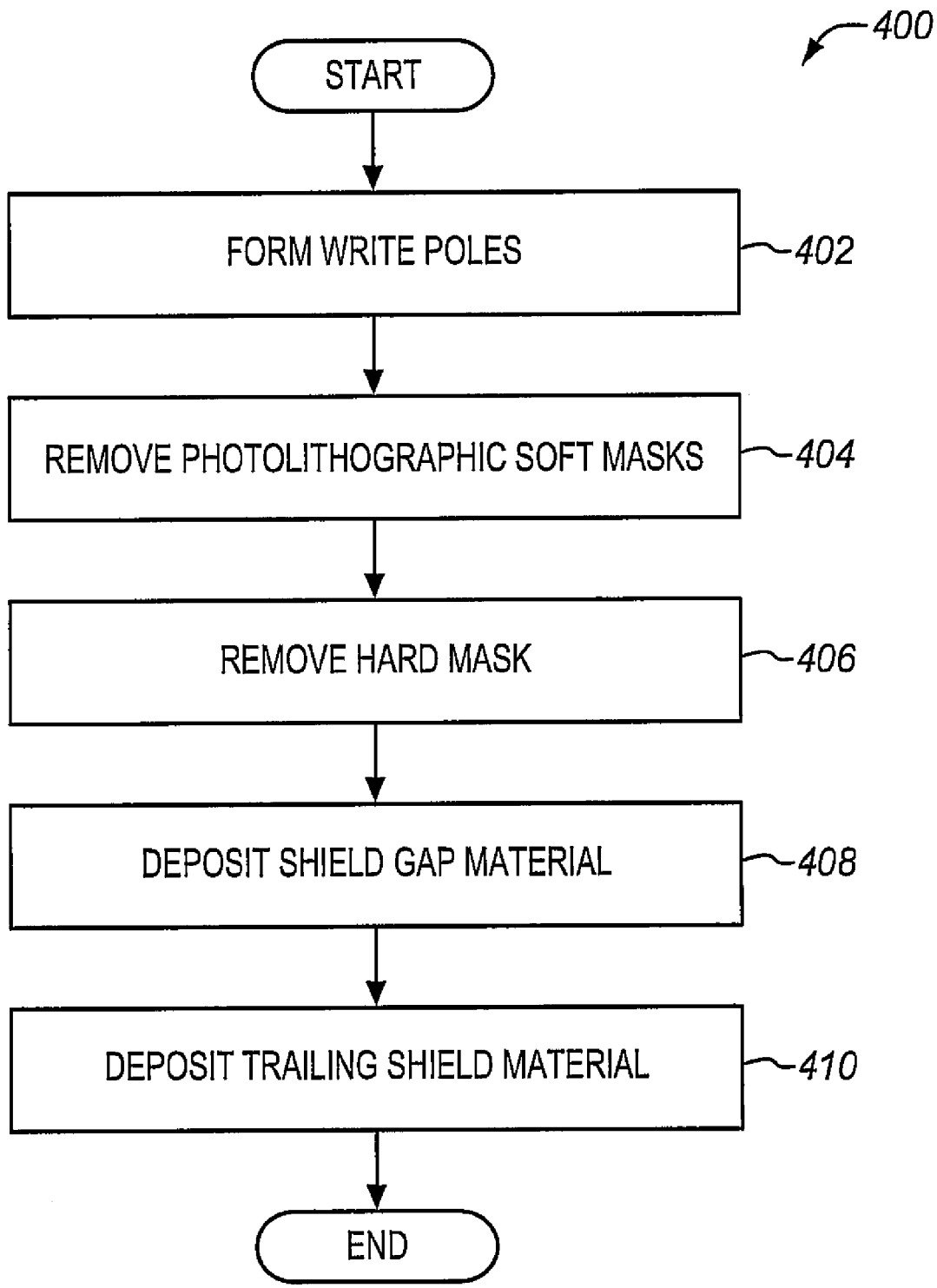
FIG. 4 is a flow chart illustrating a method of fabricating perpendicular write elements for perpendicular magnetic recording heads in an exemplary embodiment of the invention.

FIG. 4 is a flow chart illustrating a method 400 of fabricating perpendicular write elements for perpendicular magnetic recording heads in an exemplary embodiment of the invention. The steps of the flow chart in FIG. 4 are not all inclusive and may include other steps not shown. Fabrication of write elements is commonly performed at the wafer level, and those skilled in the art understand that wafer level fabrication is assumed even if the description and drawings refer to a single recording head, a single write pole/trailing shield, etc.

In step 402, write poles are formed according to one of many desired methods. As one example, the write poles may be formed substantially as described in the Background. Write pole material (e.g., NiFe) may be first deposited, and a hard mask (e.g., Thin Alumina Mask (TAM)) may then be deposited on the write pole material. Photolithographic soft masks may then be formed on the hard mask corresponding with the locations of the write poles. Ion milling may then be performed on the wafer to remove the write pole material and the hard mask not covered by the soft masks. The result is a plurality of write poles on the wafer covered by a hard mask and a soft mask.

In another example, write pole material may be first deposited, and a stop layer may then be deposited on the write pole material. A hard mask may then be deposited on the stop layer, followed by forming the soft masks on the hard mask corresponding with the locations of the write poles. Ion milling may then be performed on the wafer to remove the write pole material, the stop layer, and the hard mask not covered by the soft masks. The result is a plurality of write poles covered by a stop layer, a hard mask, and a soft mask.

There may be other examples of how to form the write poles. In any event, the assumption herein is that there are write poles formed with at least a hard mask and a soft mask covering the write poles.

In step 404, the soft masks are removed from the write poles. Removing the soft masks from the write poles means that the soft masks are removed from the areas above the write poles, which are not necessarily contacting the write poles. As discussed in the Background, a common step in fabricating write poles produce a re-deposition of write pole material after the write poles have been milled. This re-deposition step results in "fencing", which is a buildup of write pole material around the soft mask. To remove the fencing and the soft masks, a first chemical etch may be performed with Tetramethylammonium Hydroxide (TMAH) or a similar chemical to remove the fencing. Then, a second chemical etch may be performed with N-methylolacrylamide (NMP) or a similar chemical to remove the soft masks. After the fencing and the soft masks are removed, insulating material may then be deposited.

In step 406, the hard mask is removed from the write poles. The hard mask may be removed according to many desired methods. In one example, chemical mechanical polishing (CMP) may be performed to remove the desired insulating material and the hard mask. In another example, CMP may be performed to achieve a planar surface, and then an ion etching process may be performed to remove the desired insulating material and the hard mask. The term "ion etching" may refer to Reactive Ion Beam Etching (RIBE), Reactive Ion Etching (RIE), or another type of ion etching. There may be other examples of how to remove the hard mask.

With the soft mask removed and the hard mask removed, the trailing shield may be formed. In step 408, shield gap material is deposited on the write poles. Depositing shield gap material on the write poles means that the shield gap material is deposited on areas above the write poles and not necessarily directly contacting the write poles. There may be one or more intervening layers. The shield gap material may comprise Rh or a similar material. In step 410, trailing shield material for the trailing shield is deposited on the shield gap material. The shape of the trailing shield depends on the polishing or etching previously performed, such as to remove the hard mask. The trailing shield may be flat on the surface facing the write pole. The trailing shield may alternatively be convex on the surface facing the write pole or have another desired shape.

This method advantageously removes the soft masks before depositing the insulating material over the write poles. Removing the soft masks before depositing the insulating material makes the removal process easier than removing the soft masks after depositing the insulating material and performing CMP as is presently done. This method also advantageously removes the hard mask from the write poles. Prior methods left the hard mask in between the write poles and the trailing shields to define the shield gap between the write poles and the trailing shields. Unfortunately, the hard mask may not provide as accurate of a shield gap as desired. According to the methods described herein, the hard mask is removed so that shield gap material may be precisely deposited to get a desired thickness of the shield gap, such as 10-50 nm. The shield gap may advantageously be defined by the shield gap layer instead of the hard mask as in prior fabrication methods.

EXAMPLES

FIGS. 5-10 illustrate three exemplary methods of fabricating write poles and trailing shields for perpendicular write elements. These methods are merely examples and are in no way intended to limit the scope of the invention.

Figure 5:
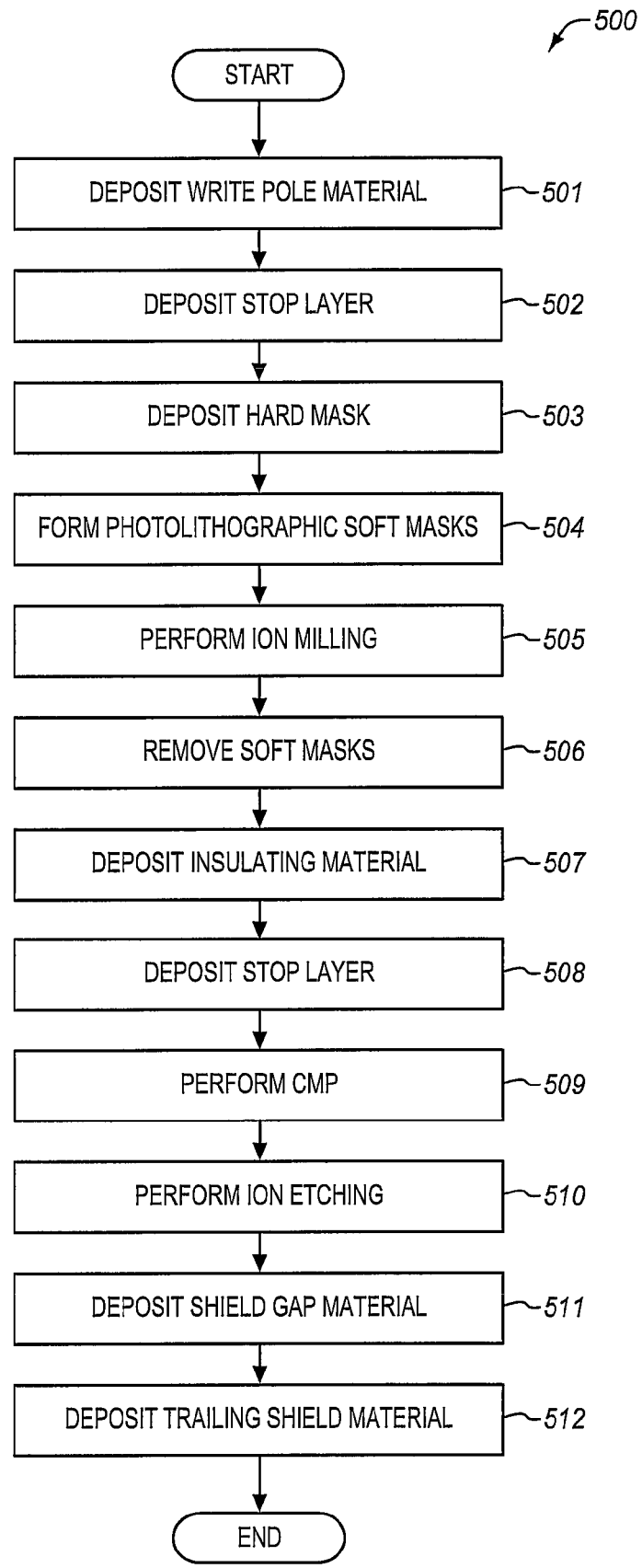
FIGS. 5-6 illustrate a first exemplary method of fabricating write poles and trailing shields for perpendicular write elements.
Figure 6:
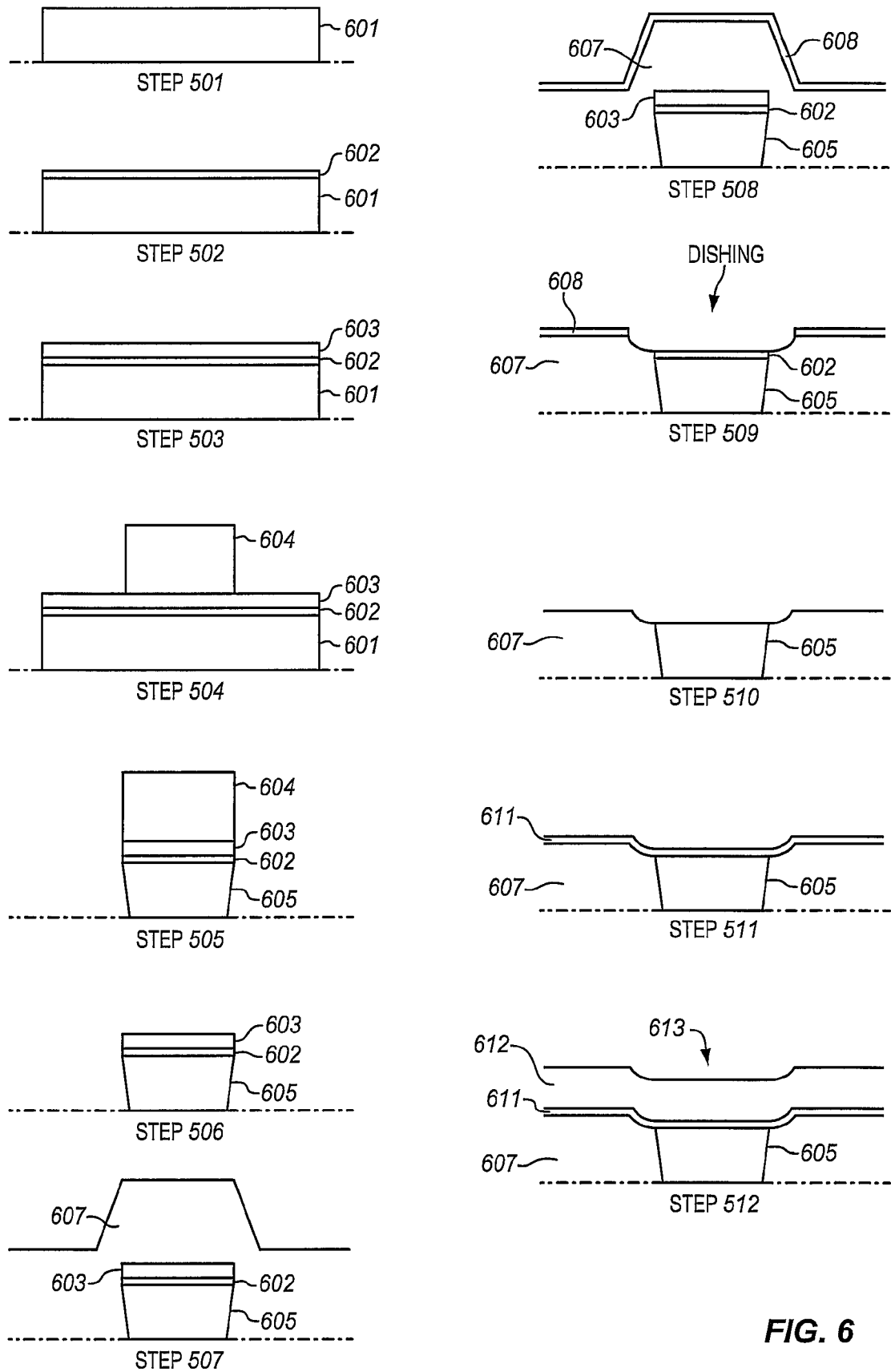

FIGS. 5-6 illustrate a first exemplary method 500 of fabricating write poles and trailing shields for perpendicular write elements. FIG. 5 is a flow chart illustrating the method 500 of fabricating, while FIG. 6 illustrates the results of method 500 in forming the layers of the write poles, the trailing shields, etc. Although method 500 described in FIG. 5 applies to wafer-level fabrication, FIG. 6 shows the results for a single perpendicular write element being fabricated on a wafer. The reference numbers of the steps shown in FIG. 5 are also referenced in FIG. 6.

For method 500, write poles are first fabricated on a wafer. To fabricate the write poles, write pole material 601 is deposited in step 501. The write pole material 601 may be NiFe or a similar material. In step 502, stop layer 602 (e.g., Rh) is deposited on the write pole material 601. One exemplary thickness is about 20 nm of Rh. In step 503, a hard mask 603 is deposited on the stop layer 602. The hard mask 603 may comprise a Thin Alumina Mask (TAM) or a similar mask having a thickness of about 10-100 nm. In step 504, photolithographic soft masks 604 are formed on the hard mask 603 corresponding with the locations of the write poles. The soft masks 604 have a shape corresponding with the desired shape of the write poles. In step 505, ion milling or a similar process is performed to form the write poles. The ion milling process removes the write pole material 601, the stop layer 602, and the hard mask 603 that are not protected by a soft mask 604. The write pole material 601 protected by the soft masks 604 forms the write poles 605. The write poles 605 at this point are covered by stop layer 602, hard mask 603, and soft mask 604.

In step 506, the soft masks 604 are removed using a chemical etching process. As previously discussed, a common step in fabricating write poles produce a re-deposition of write pole material after the write poles have been milled. This re-deposition step results in "fencing", which is a buildup of write pole material around the soft mask. To remove the fencing and the soft masks, a first chemical etch may be performed with TMAH or a similar chemical to remove the fencing. Then, a second chemical etch may be performed with NMP or a similar chemical to remove the soft masks.

After the soft masks 604 are removed, insulating material 607 may then be deposited in step 507. The insulating material may be aluminum oxide or similar material. The thickness of the insulating material 607 may be about 1.0 µm of aluminum oxide. In step 508, a stop layer 608 is deposited on the insulating material 607. The stop layer 608 may be Rh or similar material. In step 509, chemical mechanical polishing (CMP) is performed. CMP removes the "hump" of insulating material 607 above the write pole 605 down to the stop layer 608. Once the stop layer 608 is reached, a planarized surface is created on the wafer. CMP is then continued (sometimes referred to as "over-CMP") down to stop layer 602 to create "dishing" in areas where the stop layer 608 is not protecting the underlayers. The effect of dishing removes the hard mask 603 to expose the stop layer 602. In step 510, ion etching is performed to remove the stop layers 608 and 602. This process exposes the write poles 605 (the top surface of the write pole 605 in FIG. 6).

In step 511, shield gap material 611 is deposited. The shield gap material 611, such as Rh, may be about 50 nm thick. In step 512, trailing shield material 612 is deposited on the shield gap material 611 to form the trailing shield 613. The thickness of the shield gap material 611 determines the shield gap between the write poles 605 and the trailing shields 613, which may be precisely controlled according to method 500.

Figure 7:
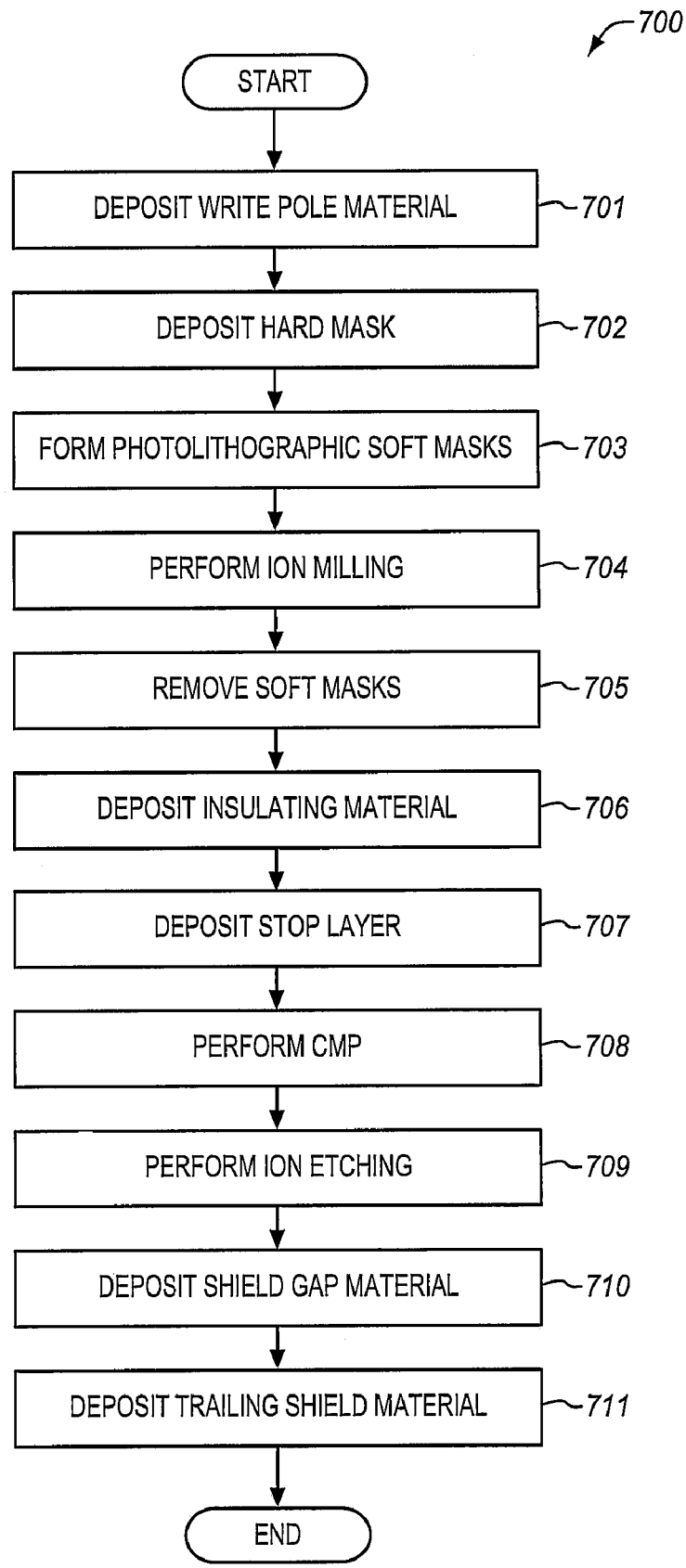
FIGS. 7-8 illustrate a second exemplary method of fabricating write poles and trailing shields for perpendicular write elements.
Figure 8:
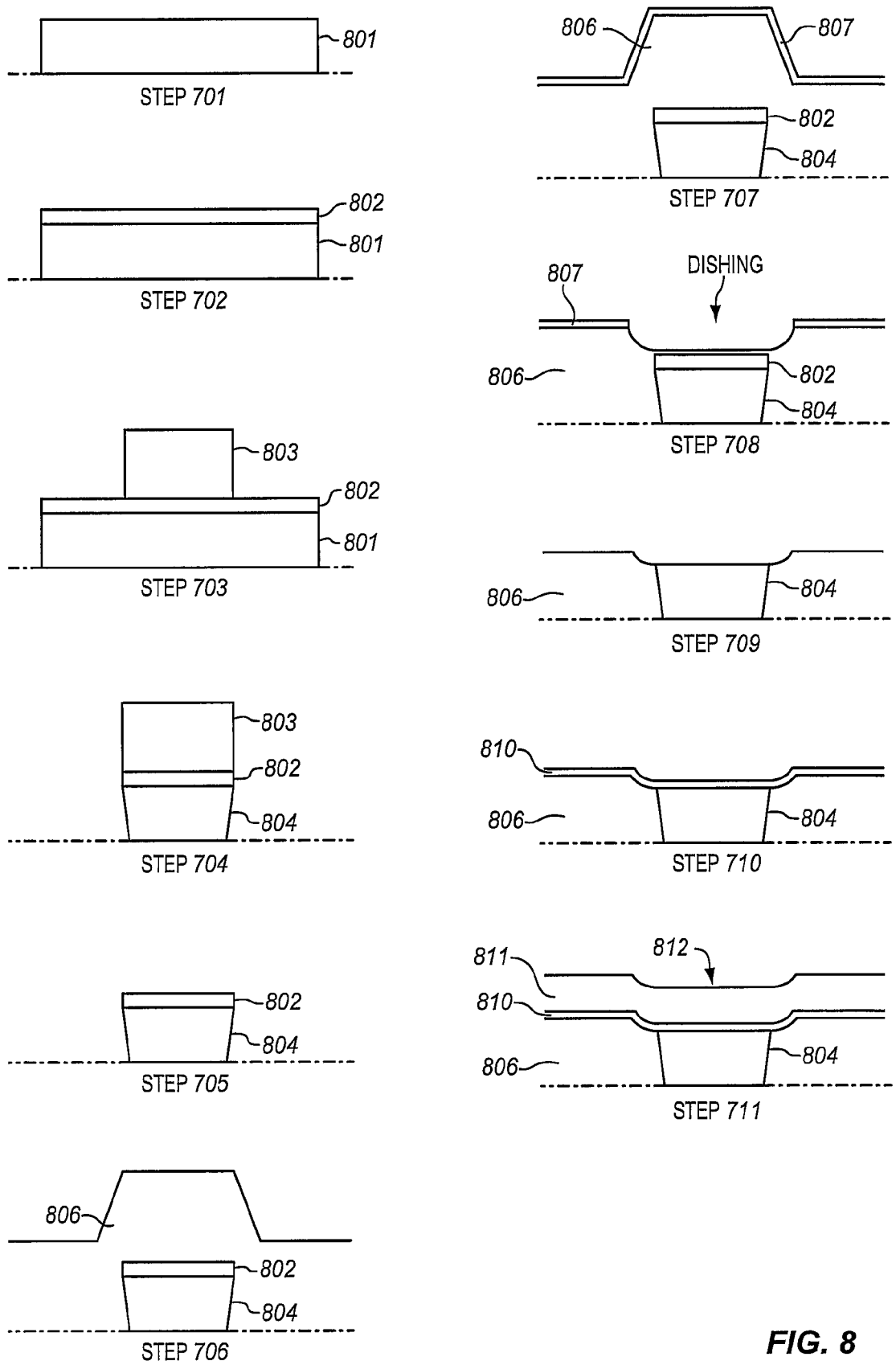

FIGS. 7-8 illustrate a second exemplary method 700 of fabricating write poles and trailing shields for perpendicular write elements. FIG. 7 is a flow chart illustrating the method 700 of fabricating, while FIG. 8 illustrates the results of method 700 in forming the layers of the write poles, the trailing shields, etc. Although method 700 described in FIG. 7 applies to wafer-level fabrication, FIG. 8 shows the results for a single perpendicular write element being fabricated on a wafer. The reference numbers of the steps shown in FIG. 7 are also referenced in FIG. 8.

For method 700, write poles are first fabricated on a wafer. To fabricate the write poles, write pole material 801 is deposited in step 701. In step 702, a hard mask 802 is deposited on the write pole material 801. The hard mask 802 may comprise a Thin Alumina Mask (TAM) or a similar mask having a thickness of about 10-100 nm. In step 703, photolithographic soft masks 803 are formed on the hard mask 802 corresponding with the locations of the write poles. The soft masks 803 have a shape corresponding with the desired shape of the write poles. In step 704, ion milling or a similar process is performed to form the write poles. The ion milling process removes the write pole material 801 and the hard mask 802 that is not protected by a soft mask 803. The write pole material 801 protected by a soft mask 803 forms the write poles 804. The write pole 804 shown in FIG. 8 is covered by a hard mask 802 and a soft mask 803.

In step 705, the soft masks 803 are removed as described in FIG. 5. After the soft masks 803 are removed, insulating material 806 may then be deposited in step 706. In step 707, a stop layer 807 is deposited on the insulating material 806. In step 708, CMP is performed. CMP removes the "hump" of insulating material 806 above the write pole 804 down to the stop layer 807. Once the stop layer 807 is reached, a planarized surface is created on the wafer. CMP is then continued (over-CMP) to create "dishing" in areas where the stop layer 608 is not protecting the underlayers. The depth of CMP is controlled to control the amount of dishing. In step 709, ion etching is performed to remove the remaining insulating material 806 and the hard mask 802 over the write poles 804. This process exposes the write poles 804 (the top surface of the write pole 804 in FIG. 8).

In step 710, shield gap material 810 is deposited on the exposed write poles 804. The shield gap material 810, such as Rh, may be about 50 nm thick. In step 711, trailing shield material 811 is deposited on the shield gap material 810 to form the trailing shield 812. The thickness of the shield gap material 810 determines the shield gap between the write poles 804 and the trailing shields 812, which again may be precisely controlled according to this method.

Figure 9:
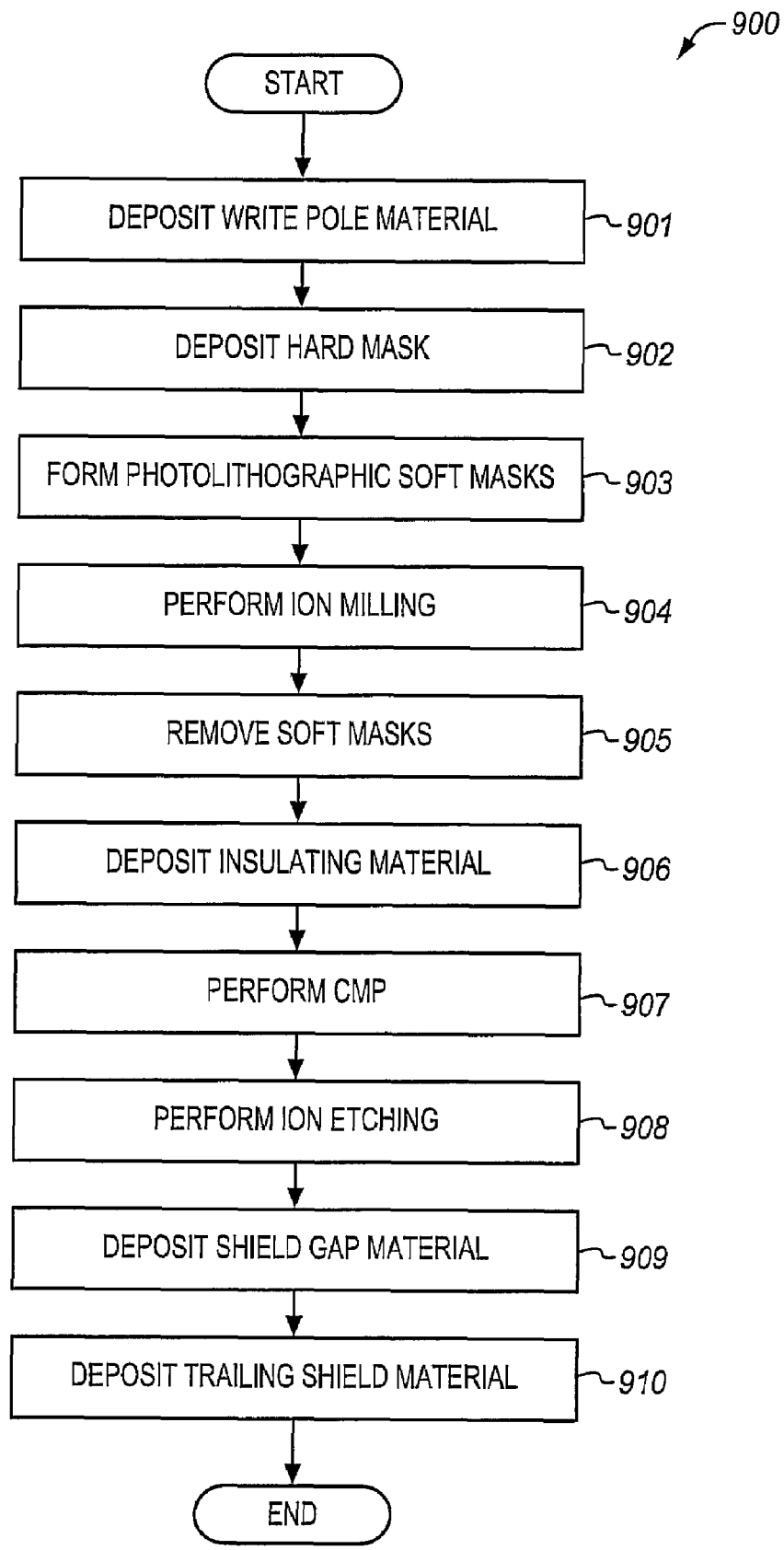
FIGS. 9-10 illustrate a third exemplary method of fabricating write poles and trailing shields for perpendicular write elements.
Figure 10:
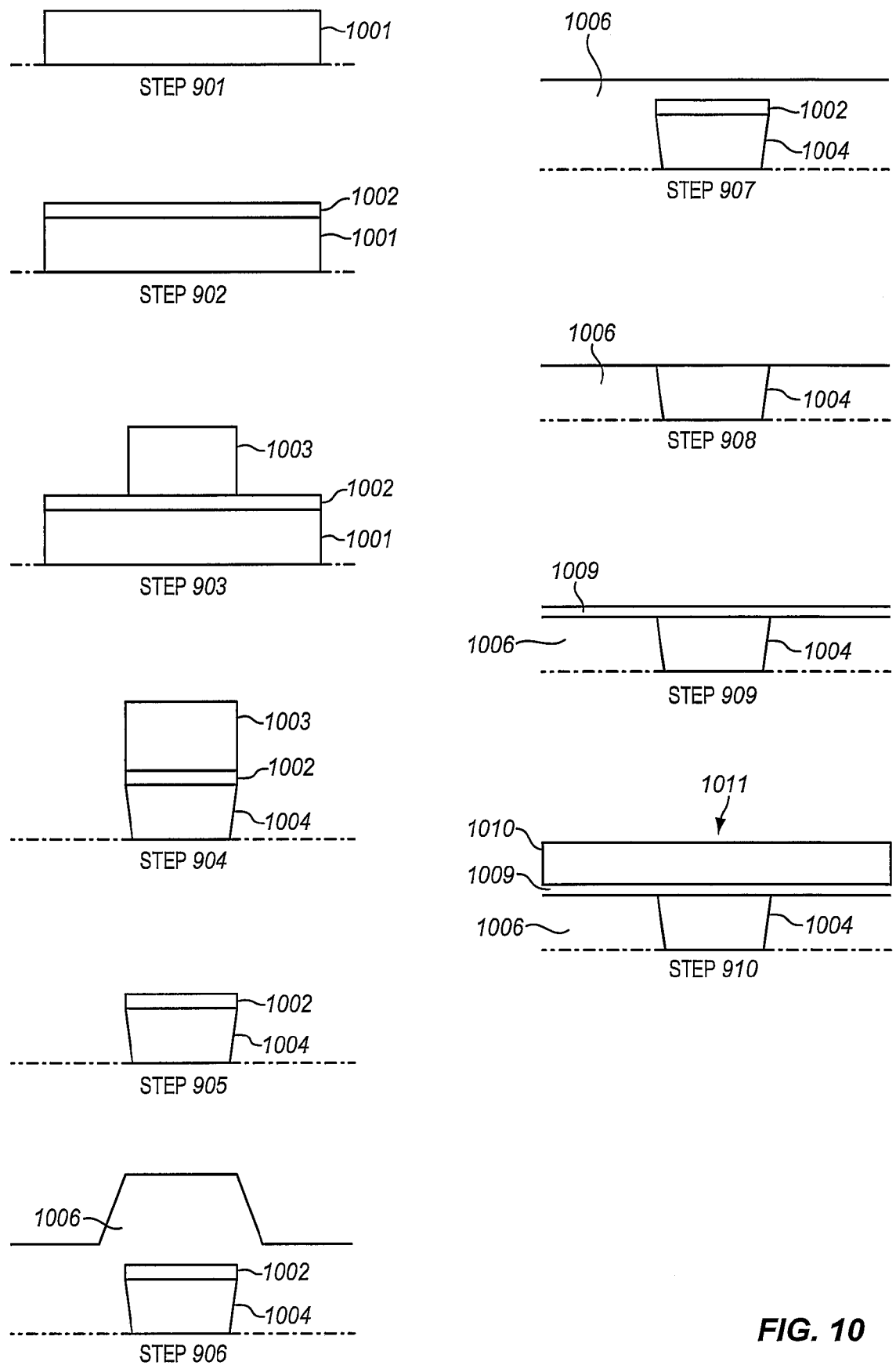

FIGS. 9-10 illustrate a third exemplary method 900 of fabricating write poles and trailing shields for perpendicular write elements. FIG. 9 is a flow chart illustrating the method 900 of fabricating, while FIG. 10 illustrates the results of method 900 in forming the layers of the write poles, the trailing shields, etc. Although method 900 described in FIG. 9 applies to wafer-level fabrication, FIG. 10 shows the results for a single perpendicular write element being fabricated on a wafer. The reference numbers of the steps shown in FIG. 9 are also referenced in FIG. 10.

For method 900, steps 901-906 of FIG. 9 correspond with steps 701-706 of FIG. 7. In step 907, CMP is performed. CMP removes the "hump" of insulating material 1006 above the write pole 1004 to form a planarized surface on the wafer. In step 908, ion etching is performed to remove the remaining insulating material 1006 and the hard mask 1002 over the write poles 1004. This process exposes the write poles 1004 (the top surface of the write pole 1004 in FIG. 10).

In step 909, shield gap material 1009 is deposited. The shield gap material 1009, such as Rh, may be about 50 nm thick. In step 910, trailing shield material 1010 is deposited on the shield gap material 1009 to form the trailing shields 1011. The thickness of the shield gap material 1009 determines the shield gap between the write poles 1004 and the trailing shields 1011, which again may be precisely controlled according to this method.

Although specific embodiments were described herein, the scope of the invention is not limited to those specific embodiments. The scope of the invention is defined by the following claims and any equivalents thereof.

We claim:

1. A method of fabricating perpendicular write elements for perpendicular magnetic recording heads, the method comprising:
    forming write poles with at least a hard mask and a soft mask covering the write poles;
    removing the soft mask from the write poles by performing a first chemical etch with TMAH and performing a second chemical etch with NMP;
    removing the hard mask from the write poles;
    depositing shield gap material on the write poles; and
    depositing trailing shield material for the trailing shield on the shield gap material.

2. The method of claim 1 wherein removing the hard mask comprises:
    performing chemical mechanical polishing (CMP) to remove the hard mask.

3. The method of claim 1 wherein the hard mask comprises a Thin Alumina Mask (TAM).

4. The method of claim 1 wherein forming write poles with at least a hard mask and a soft mask covering the write poles comprises:
    forming the write poles with the hard mask formed on the write pole and with the soft mask formed on the hard mask.

5. The method of claim 1 wherein forming write poles with at least a hard mask and a soft mask covering the write poles comprises:
    forming the write pole with a stop layer formed on the write pole, with the hard mask formed on the stop layer, and with the soft mask formed on the hard mask.

6. The method of claim 1 wherein removing the hard mask comprises:
    performing an ion etching process to remove the hard mask.

7. The method of claim 6 wherein performing the ion etching process comprises:
    performing Reactive Ion Beam Etching (RIBE).

8. The method of claim 6 wherein performing the ion etching process comprises:
    performing Reactive Ion Etching (RIE).

9. A method of fabricating perpendicular write elements for perpendicular magnetic recording heads, the method comprising:
    depositing write pole material;
    depositing a first stop layer;
    depositing a hard mask on the first stop layer;
    forming soft masks on the hard mask;
    performing ion milling to form the write poles;
    removing the soft masks;
    depositing insulating material;
    depositing a second stop layer on the insulating layer;
    performing chemical mechanical polishing (CMP) down to the first and second stop layers to remove the hard mask;

performing ion etching to remove the first and second stop layers and expose the write poles;

depositing shield gap material on the exposed write poles; and depositing trailing shield material on the shield gap material.

10. The method of claim 9 wherein performing chemical mechanical polishing (CMP) down to the first and second stop layers comprises:

performing over-CMP to create dishing in areas not covered by the second stop layer.

11. The method of claim 9 wherein removing the soft masks comprises:

performing a chemical etch on the soft masks.

12. The method of claim 11 wherein performing a chemical etch comprises:

performing a first chemical etch with TMAH; and
performing a second chemical etch with NMP.

13. A method of fabricating perpendicular write elements for perpendicular magnetic recording heads, the method comprising:

depositing write pole material;
depositing a hard mask on the write pole material;
forming soft masks on the hard mask;
performing ion milling to form the write poles;
removing the soft masks;
depositing insulating material;
depositing a stop layer on the insulating material;
performing chemical mechanical polishing (CMP) down to the stop layer;
performing ion etching to remove the hard mask and expose the write poles;
depositing shield gap material on the exposed write poles; and
depositing trailing shield material on the shield gap material.

14. The method of claim 13 wherein performing ion etching comprises:

performing reactive ion beam etching (RIBE) or reactive ion etching (RIE) to remove the hard mask.

15. The method of claim 13 wherein performing chemical mechanical polishing (CMP) down to the stop layer comprises:

performing over-CMP to create dishing in areas not covered by the stop layer.

16. The method of claim 13 wherein removing the soft masks comprises:

performing a chemical etch on the soft masks.

17. The method of claim 16 wherein performing a chemical etch comprises:

performing a first chemical etch with TMAH; and
performing a second chemical etch with NMP.

18. A method of fabricating perpendicular write elements for perpendicular magnetic recording heads, the method comprising:

depositing write pole material;
depositing a hard mask on the write pole material;
forming soft masks on the hard mask;
performing ion milling to form the write poles;
removing the soft masks;
depositing insulating material;
performing chemical mechanical polishing (CMP) to generate a planar surface;
performing ion etching to remove the hard mask and expose the write poles;
depositing shield gap material on the exposed write poles; and
depositing trailing shield material on the shield gap material.

19. The method of claim 18 wherein performing ion etching comprises:

performing reactive ion beam etching (RIBE) or reactive ion etching (RIE) to remove the hard mask.

20. The method of claim 18 wherein removing the soft masks comprises:

performing a chemical etch on the soft masks.

21. The method of claim 20 wherein performing a chemical etch comprises:

performing a first chemical etch with TMAH; and
performing a second chemical etch with NMP.

* * * * *

UNITED STATES PATENT AND TRADEMARK OFFICE
CERTIFICATE OF CORRECTION

PATENT NO. : 7,648,731 B2 Page 1 of 1
APPLICATION NO. : 11/380154
DATED : January 19, 2010
INVENTOR(S) : Guthrie et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 939 days.

Signed and Sealed this

Twenty-third Day of November, 2010

David J. Kappos
*Director of the United States Patent and Trademark Office*